US006259183B1

(12) United States Patent
Hotta et al.

(10) Patent No.: US 6,259,183 B1
(45) Date of Patent: Jul. 10, 2001

(54) CARBON COMMUTATOR

(75) Inventors: Tokio Hotta; Noboru Yoshikawa; Yoichi Sakaura, all of Matsusaka (JP)

(73) Assignee: TRIS Inc. (JP)

( * ) Notice: Subject to any disclaimer, the term of this patent is extended or adjusted under 35 U.S.C. 154(b) by 0 days.

(21) Appl. No.: 09/437,939

(22) Filed: Nov. 10, 1999

(30) Foreign Application Priority Data

Nov. 13, 1998 (JP) .................................................. 10-323666

(51) Int. Cl.[7] ...................................................... H02K 13/00
(52) U.S. Cl. ............................................ 310/233; 310/237
(58) Field of Search .................................... 310/233, 235, 310/236, 237, 42; 29/596–598

(56) References Cited

U.S. PATENT DOCUMENTS

| | | | | |
|---|---|---|---|---|
| 4,358,319 | | 11/1982 | Yoshida et al. | 310/237 |
| 5,925,961 | * | 7/1999 | Sugiyanma | 310/237 |
| 5,932,949 | * | 8/1999 | Ziegler et al. | 310/236 |
| 5,996,210 | * | 12/1999 | Konig | 29/597 |

FOREIGN PATENT DOCUMENTS

| | | |
|---|---|---|
| 39 11 579 A1 | 10/1990 | (DE) . |
| 0 583 892 | 2/1994 | (EP) . |
| 2 633 781 | 7/1989 | (FR) . |
| 7-42223 | 9/1995 | (JP) . |

OTHER PUBLICATIONS

Communication Pursuant to Article 96(2) EPC from European Patent Application No. 99 309 019.0–1231, Nov. 16, 2000.

* cited by examiner

*Primary Examiner*—Tran Nguyen
(74) *Attorney, Agent, or Firm*—Harness, Dickey & Pierce, P.L.C.

(57) ABSTRACT

Disclosed is a carbon commutator, comprising a plurality of metal segments each having a through-hole, a plurality of carbon segments each having a projecting portion, which contains a metal, being inserted into the through-hole to be deformed so as to join the carbon segment to the metal segment, and a commutator body on which a plurality of the metal/carbon joined segments are arranged fixedly in a manner to form a substantially circular body.

7 Claims, 2 Drawing Sheets

CARBON COMMUTATOR

BACKGROUND OF THE INVENTION

The present invention relates to a carbon commutator used in, for example, a motor for a fuel pump.

An in-tank type fuel supply pump, in which a motor and a pump are integrally mounted within a fuel tank, is used for supplying fuel to, for example, an automobile. In general, the fuel supply pump of this type is constructed so that the fuel can be moved out of the fuel supply pump from its pump section through the motor housing, and brought into contact with the commutator of the motor. If gasoline containing alcohol is used as a fuel, it is known in the art that copper in that portion of the commutator which is brought into a sliding contact with the brush is corroded by the alcohol contained in the fuel. The corroded copper markedly shortens the life of the pump.

As a commutator taking measures against an alcohol-containing fuel, proposed is a carbon commutator, in which a metal segment is joined to a carbon segment by soldering via a metal plating interposed therebetween, and a brush is brought into a sliding contact with the carbon segment. A commutator of this type is disclosed in, for example, U.S. Pat. No. 5,175,463. However, a motor which equips a carbon commutator may perform poorly because the plating solution permeats through the carbon segment in the plating process. Also, the plating treatment may increase the manufacturing cost. Further, in the subsequent process of welding a coil to the carbon commutator, the solder can be melted and cause peeling or positional deviation of the carbon segment.

Another method to produce a carbon commutator is disclosed in, for example, Japanese Patent Disclosure (Kokai) No. 10-004653. In this method, a projection mounted on the carbon segment is inserted into a hole made in the metal segment so as to join these two segments. However, the projection mounted on the carbon segment only consists of carbon element so that it lacks ductility. Therefore, the projection is readily abraded when inserted into the hole, resulting in failure to join the two segments firmly. JP '653 also teaches an idea that plating solution which is applied to both segments joins them together. However, this measure may also increase the manufacturing cost.

BRIEF SUMMARY OF THE INVENTION

The object of the present invention is to provide a carbon commutator, which can join a metal segment and a carbon segment at a low cost without fail.

According to the first aspect of the present invention, there is provided a carbon commutator, comprising:

a plurality of metal segments each having a through-hole;

a plurality of carbon segments each having a projecting portion, which contains a metal, and is inserted into the through-hole to be deformed so as to join the carbon segment to the metal segment; and a commutator body on which a plurality of the metal/carbon joined segments are fixed in a manner to form a substantially circular body.

In the first aspect of the present invention, it is desirable for each carbon segment stated above to contain more metals in the section where it contacts with the metal segment.

Additionally, in the first aspect of the present invention, it is also desirable for the projecting portion of the carbon segment to contain 60 to 100% by weight of a metal.

Moreover, in the first aspect of the present invention, it is desirable for the projecting portion of the carbon segment to contain 70 to 100% by weight of a metal.

Further, in the first aspect of the present invention, it is desirable for the metal to be selected from the group consisting of copper, nickel, silver, gold, tin, zinc, and alloy thereof.

According to the second aspect of the present invention, there is provided a carbon commutator, comprising:

a plurality of metal segments each having a through-hole;

a plurality of carbon segments of a double layer structure consisting of a carbon layer and a metal-containing carbon layer which has a projecting portion inserted into the through-hole so as to caulk the carbon segment and the metal segment to join them together; and a commutator body on which a plurality of the metal segments, which have carbon segments joined thereto, are arranged in a manner to form a substantially circular body.

In the second aspect of the present invention, it is desirable for the metal-containing carbon layer to contain 60 to 100% by weight of a metal.

Additionally, in the second aspect of the present invention, it is also desirable for the metal-containing carbon layer to contain 70 to 100% by weight of metal.

Further, in the second aspect of the present invention, it is desirable for the metal to be selected from the group consisting of copper, nickel, silver, gold, tin, zinc, and alloy thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will now be described in detail with reference to the accompanying drawings. A carbon commutator of the present invention includes a planar carbon commutator, a cylindrical commutator, etc.

A carbon commutator of the present invention comprises a plurality of carbon segments, a plurality of metal segments, and a commutator body.

Each of the carbon segments is brought into contact with a brush in a motor using the carbon commutator. The plural carbon segments can be prepared by dividing a single carbon member which contains carbon as a main component into a plurality of sub-sections.

Figure 1A:
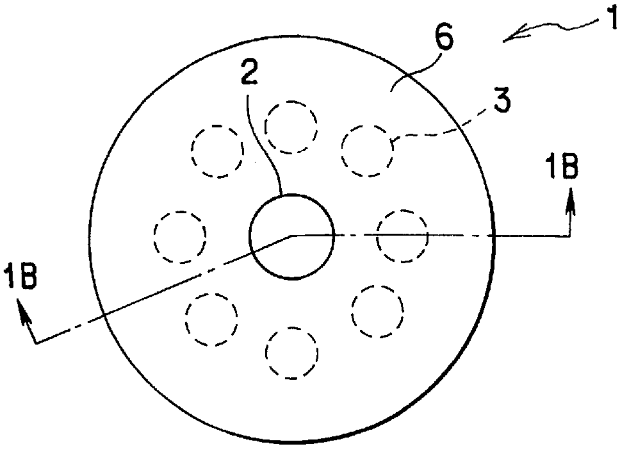
FIGS. 1A and 1B are a plan view and a cross sectional view, respectively, exemplifying a carbon member of a commutator according to one embodiment of the present invention.
Figure 1B:
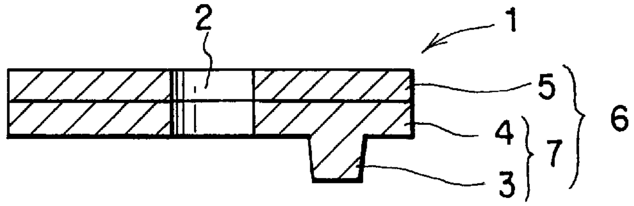

FIGS. 1A and 1B collectively exemplify such a carbon member as a plate-like carbon member 1 for a planar carbon commutator. Specifically, FIG. 1A is a plan view schematically showing the carbon member 1, and FIG. 1B is a cross sectional view along the line 1B—1B shown in FIG. 1A. As shown in the drawings, the carbon member 1 is a disk-like member having a circular through-hole 2 in the center. The carbon member 1 can be divided with a plurality of straight lines passing through the center of the member 1 so as to form fan-shaped carbon segments 6 of the same shape. In FIG. 1A, the carbon member 1 can be divided into 8 carbon segments 6.

As shown in FIG. 1B, projecting portions 3 of the same shape are formed on the surfaces of the carbon segments 6. Each projecting portion 3 is designed to have the larger height than the thickness of the metal segment so as to permit the projecting portion 3 to extend through the through-hole made in the metal segment such that the tip of the projecting portion 3 is projected out of the metal segment.

In the present invention, the carbon segment 6 includes a metal-containing carbon layer 7 and at least includes metals in the projecting portion 3, as shown in FIG. 1B. The metal can be selected from the group consisting of elemental metals such as copper, nickel, silver, gold, tin, zinc, and alloys of those metals. The metal content of the metal-containing carbon layer should be 60 to 100%, preferably 70 to 100%. If the metal content is lower than 60%, the metal-containing projecting portion 3 can be deformed insufficiently under pressure, leading to breakage of the projecting portion 3, as described hereinlater in detail.

The metal-containing projecting portion 3 of the carbon segment 6 can exhibit a ductility. As a result, the projecting portion 3 is less abraded when the projecting portion 3 is inserted through the through-hole made in the metal segment. Also, the projecting portion 3 with ductility can be more easily deformed under pressure. It follows that, when the projecting portion 3 is inserted through the through-hole of the metal segment, the tip portion of the projecting portion 3 which is projected out of the through-hole can be easily deformed under pressure so as to produce a caulking effect. Because of the caulking effect of the projecting portion 3, the carbon segment 6 and the metal segment can be strongly joined to each other without fail.

In addition to the mechanical joining of the carbon segment 6 and the metal segment by the deformed projecting portion 3 as described above, a solder or a conductive adhesive can be used to join these two members more satisfactorily. Particularly, a solder exhibits a sufficiently high wettability on the metal-containing carbon layer 7 of the carbon segment. As a result, these two segments can be joined to each other strongly without fail by using only a solder without any metal plating.

As shown in FIG. 1B, the carbon segment 6 includes a contact portion 4 to be contacted with the metal segment. It is desirable for the contact portion 4 to consist of a metal-containing carbon layer. The kind and amount of the metal contained in the contact portion 4 are equal to those of the metal contained in the projecting portion 3. The metal contained in the contact portion 4 can increase the electrical conductivity of the contact portion 4. Naturally, the contact portion 4 of a high conductivity permits a more satisfactory electrical connection between the carbon segment and the metal segment.

As described above, it is possible to form the projecting portion 3 or both the projecting portion 3 and contact portion 4 with a metal-containing carbon layer. In other words, the carbon segment 6 may be of a double layer structure which consists of a carbon layer 5 consisting of carbon alone and a metal-containing carbon layer 7. The metal-containing carbon layer 7 can consist of a plurality of sub-layers which have different metal content. Any number of sub-layers and any metal content of each sub-layer can be used to keep the entire metal content of the metal-containing carbon layer 7 within a given range, e.g., 60 to 100%.

In the field of this technology, a multi-stage type of multi-layer pressing technology which is widely known in the art can be used to form the metal-containing carbon layer 7. The multi-layer pressing technology is established in the manufacturing process of a metal-graphite electric brush, and can allow both the projecting portion 3 and contact portion 4 to contain a metal element. The multi-stage type pressing technology is employed in a manufacturing process of a powder metallurgical article. This technology can allow only the projecting portion 3 or both the projecting portion 3 and contact portion 4 to contain a metal. Further, the multi-stage pressing technology can give a higher density and a higher mechanical strength to the projecting portion 3. As a result, the projection portion 3 can be deformed to join the carbon segment to the metal segment more strongly without fail.

As described above, the metal-containing layer 7 in the present invention can be formed with established technologies. Therefore, the carbon segment 6 and the carbon commutator using it can be manufactured at a low cost.

The commutator of the present invention also includes a plurality of metal segments. These metal segments can be obtained by, for example, dividing a single metal member into a plurality of segments.

Figure 2A:
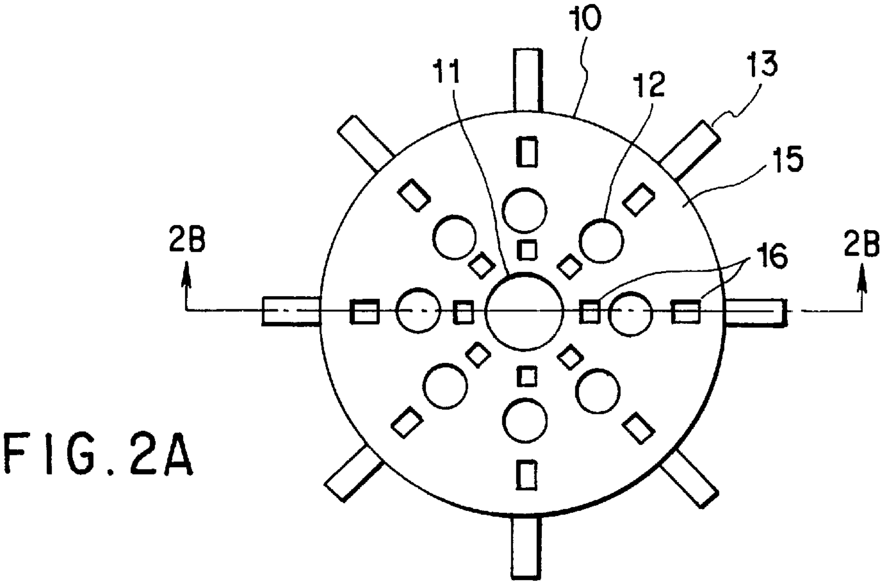
FIGS. 2A and 2B are a plan view and a cross sectional view, respectively, exemplifying a metal member of a commutator according to one embodiment of the present invention.
Figure 2B:
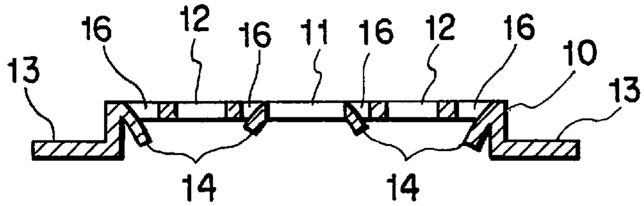

FIGS. 2A and 2B collectively show a plate-like metal member 10 for a planar carbon commutator as an example of such a metal member. Specifically, FIG. 2A is a plan view schematically showing the metal member, and FIG. 2B is a cross sectional view along the line 2B—2B shown in FIG. 2A. As shown in the drawings, the metal member 10 is a disk-like member having a circular through-hole 11 in the center. The through-hole 11 is equal in diameter to the through-hole 2 of the carbon member 1 show in FIG. 1A.

As shown in FIG. 2A, the metal member 10 can be divided with a plurality of straight lines each passing through the center of the metal member 10 to form fan-shaped metal segments 15 of the same shape. The number of metal segments 15 is equal to that of the carbon segments 6. In FIG. 2A, the metal member 10 can be divided into 8 metal segments 15. Each metal segment 15 is arranged to collectively form a substantially circular metal plate, like the carbon segments 6 arranged to form a substantially circular carbon plate. As described previously, the metal segment 15 is designed to have a smaller thickness than the height of the projecting portion 3 of the carbon segment 6. Further, each of the metal segments 15 has a through-hole 12 through which the projecting portion 3 of the carbon segment 6 can extend.

As shown in FIGS. 2A and 2B, riser pieces 13 each serving to connect electrically the carbon segment 6 to an external circuit are mounted to the outer circumferential peripheries of the metal segments 15. Also, a pair of claws 14 are formed on the lower surface of the metal segment 15 by partly punching those portions of the metal segment 15 which are positioned adjacent to the through-hole 12. As a result of the punching, these claws 14 are obliquely bent toward the through-hole 12 and holes 16 are formed. In other words, the claws 14 are hook-like members to fix the metal segment 15 to a commutator body without fail.

Figure 3A:
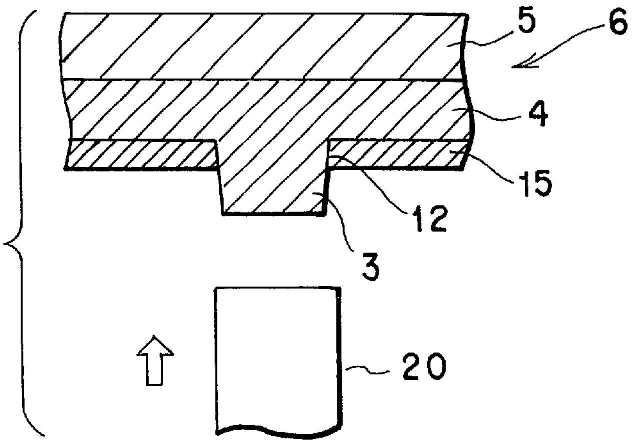
FIGS. 3A and 3B are cross sectional views exemplifying how to join the carbon member to the metal member of the commutator of the present invention.
Figure 3B:
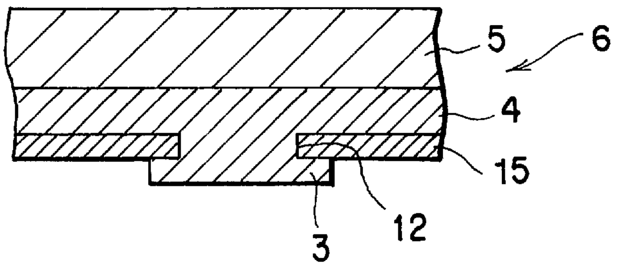

FIGS. 3A and 3B schematically exemplify how the projecting portion 3 inserted through the through-hole 12 is deformed to join the carbon segment 6 to the metal segment 15. In the first step, the carbon segment 6 is superposed on the metal segment 15 to insert the projecting portion 3 of the carbon segment 6 through the through-hole 12 of the metal segment 15, as shown in FIG. 3A. Then, the tip portion of the projecting portion 3 projected out of the through-hole 12 is pressurized by a deforming caulking tool 20. As a result, the pressurized tip portion can be deformed flat to join the carbon segment 6 to the metal segment 15 without fail, as shown in FIG. 3B.

The commutator of the present invention further includes a commutator body on which the joined pairs of the carbon segments 6 and the metal segments 15 are arranged fixedly to form a substantially circular plate-like member. The commutator body consists of a resin material such as a phenolic resin and is prepared by a resin molding, as described hereinlater.

The carbon commutator of the present invention can be manufactured as follows:

(1) In the first step, the disk-like carbon member 1 is joined to the disk-like metal member 10. In the joining step, the projecting portion 3 of each carbon segments 6 of the carbon member 1 is inserted through the through-hole 12 of each metal segments 15 of the metal member 10, followed by deforming the tip portion of the projecting portion 3 projected out of the through-hole 12, as described previously.

(2) In the next step, the joined integral structure of disk-like of the carbon member 1 and the metal member 10 is fixed on the commutator body. To be more specific, a resin molding is applied to the joined integral structure according to the molding technology widely known in the art to form the commutator body of resin to which the joined integral structure is fixed. As described previously, the metal member 10 is fixed firmly to the commutator body of resin with the claws 14 of each metal segments 15.

(3) Then, the jointed integral structure of disk-like of the carbon member 1 and the metal member 10 is divided into a plurality of segments. To be more specific, the joined integral structure is cut with blades into a plurality of segments, e.g., 8 segments, of the same shape according to the cutting technology widely known in the art. As a result, the carbon segments 6 and the metal segments 15 are arranged on the commutator body to form a substantially circular plate-like member. Thus, the carbon commutator of the present invention is prepared.

Figure 4A:
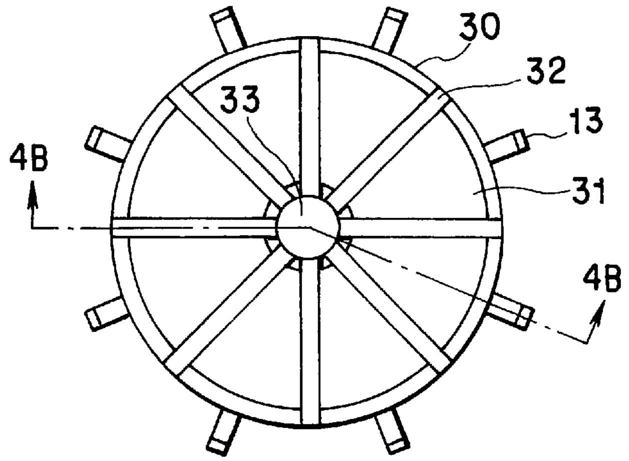
FIGS. 4A and 4B are a plan view and a cross sectional view, respectively, exemplifying a carbon commutator according to one embodiment of the present invention.
Figure 4B:
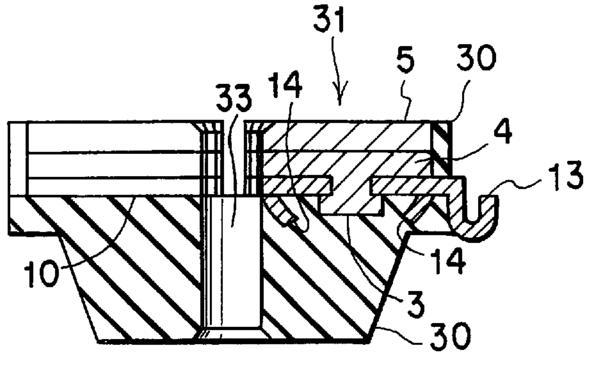

FIGS. 4A and 4B collectively exemplify a planar carbon commutator thus prepared. Specifically, FIG. 4A is a plan view schematically showing the carbon commutator, and FIG. 4B is a cross sectional view along the line 4B—4B shown in FIG. 4A. As shown in the drawings, a plurality of segments 31 each consisting of the carbon segment and the metal segment are arranged on a commutator body 30 to form a substantially circular plate-like member which is fixed to the body 30 made of resin. Eight segments 31 are shown in these drawings. These segments 31 are separated via grooves 32 which are made by cutting the disk-like integral structure. The riser piece 13 of each metal segment is bent to facilitate the connection to an external circuit. A circular through-hole 33 is formed in the center of the carbon commutator. A rotary shaft is inserted into the through-hole 33 for rotation of the carbon commutator. The through-hole 33 consists of the through-hole 2 in the carbon member 1 and the through-hole 11 made in the metal member 10.

As described above, the present invention provides a carbon commutator, in which the metal segment and the carbon segment are joined to each other at a low cost without fail.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon commutator, comprising:

a plurality of metal segments each having a though-hole;

a plurality of carbon segments each having a double layer structure consisting of a carbon layer and a metal-containing carbon layer, said metal-containing carbon layer having a projecting portion inserted into said through-hole so as to join the carbon segment and the metal segment together to form a metal-carbon joined segment; and a commutator body on which a plurality of said metal-carbon joined segments are arranged in a manner to form a substantially circular body.

2. A carbon commutator according to claim 1, wherein said metal-containing carbon layer contains 60% to 100% by weight of a metal material.

3. A carbon commutator according to claim 2, wherein said metal-containing carbon layer contains 70% to 100% by weight of a metal material.

4. A carbon commutator according to claim 1, wherein the metal-containing carbon layer contains a metal selected from the group consisting of copper, nickel, silver, gold, tin, zinc, and alloy thereof.

5. A carbon commutator, comprising:

a plurality of metal segments each having a through-hole;

a plurality of carbon segments each having a projecting portion, said projecting portion containing 60% to 100% by weight of a metal material, each carbon segment being inserted into said through-hole and deformed so as to join the carbon segment to metal segment to form a metal-carbon joined segment; and a commutator body on which a plurality of the metal-carbon joined segments are arranged fixedly in a manner to form a substantially circular body.

6. A carbon commutator according to claim 5, wherein said projecting portion of the carbon segment contains 70% to 100% by weight of a metal material.

7. A carbon commutator according to claim 5, wherein said projecting portion of the carbon segment contains a metal selected from the group consisting of copper, nickel, silver, gold, tin, zinc, and alloy thereof.

* * * * *